US008668802B2

(12) United States Patent
Van Wijngaarden

(10) Patent No.: US 8,668,802 B2
(45) Date of Patent: Mar. 11, 2014

(54) METHOD AND DEVICE FOR ELECTROMAGNETIC WELDING OF MOULDED PARTS

(75) Inventor: Martijn Jacques Van Wijngaarden, Lisserbroek (NL)

(73) Assignee: Kok & Van Engelen Composite Structures B.V., 'S-Gravenhage (NL)

( * ) Notice: Subject to any disclaimer, the term of this patent is extended or adjusted under 35 U.S.C. 154(b) by 842 days.

(21) Appl. No.: 12/597,613

(22) PCT Filed: Apr. 24, 2008

(86) PCT No.: PCT/NL2008/050242
§ 371 (c)(1),
(2), (4) Date: Mar. 29, 2010

(87) PCT Pub. No.: WO2008/133507
PCT Pub. Date: Nov. 6, 2008

(65) Prior Publication Data
US 2010/0206469 A1     Aug. 19, 2010

(30) Foreign Application Priority Data
Apr. 26, 2007   (NL) ...................................... 2000615

(51) Int. Cl.
*B29C 65/02*     (2006.01)
(52) U.S. Cl.
USPC ....................................................... 156/272.2
(58) Field of Classification Search
USPC .................................. 156/245, 272.2, 272.4
See application file for complete search history.

(56) References Cited

U.S. PATENT DOCUMENTS

| | | | | |
|---|---|---|---|---|
| 4,507,907 A | * | 4/1985 | Wolfson | 53/478 |
| 4,836,691 A | * | 6/1989 | Suzuki et al. | 383/80 |
| 4,969,968 A | * | 11/1990 | Leatherman | 156/272.4 |
| 5,710,412 A | * | 1/1998 | Hansen | 219/633 |
| 6,023,054 A | * | 2/2000 | Johnson, Jr. | 219/634 |

FOREIGN PATENT DOCUMENTS

| | | | |
|---|---|---|---|
| DE | 2542898 A | * | 3/1977 |
| JP | 62261423 A | * | 11/1987 |
| NL | 7410116 | | 2/1975 |
| WO | 9620823 A1 | | 7/1996 |
| WO | 0185827 A2 | | 11/2001 |

OTHER PUBLICATIONS

Preliminary Report on Patentability for International Patent Application No. PCT/NL2008/050242; Sep. 8, 2009.
Search Report for International Patent Application No. PCT/NL2008/050242; Nov. 5, 2008.

\* cited by examiner

*Primary Examiner* — Daniel McNally
(74) *Attorney, Agent, or Firm* — Jason A. Bernstein; Barnes & Thornburg LLP

(57) ABSTRACT

A method for electromagnetic welding of molded parts wherein a mold and at least two molded parts for coupling are placed in the mold, wherein at least a contact surface between the molded parts comprises a thermally activiated coupling means and an induction-senstive component. The coupling means is activated by heating the induction-senstive component by means of an inductor. The inductor comprises an electrical conductor which, under alternating voltage, generates an electromagnetic field which is substantially cylindrical in at least a direction of welding. The molded parts are pressed together in the configuration defined by the mold, wherein the molded parts are coupled by the thermally activated coupling means. Also disclosed is an assembly of molded parts, an inductor, an assembly of the inductor with an alternating current generator, and a device for electromagnetic welding.

9 Claims, 3 Drawing Sheets

METHOD AND DEVICE FOR ELECTROMAGNETIC WELDING OF MOULDED PARTS

PRIORITY CLAIM

This patent application is a U.S. National Phase of International Patent Application No. PCT/NL2008/050242, filed Apr. 24, 2008, which claims priority to Netherlands Patent Application No. 2000615, filed Apr. 26, 2007, the disclosures of which are incorporated herein by reference in their entirety.

FIELD

The present disclosure relates to a method for electromagnetic welding of moulded parts, an assembly of moulded parts obtained according to this method, an inductor for use in the method, an assembly of an inductor with an alternating current generator and a device for electromagnetic welding.

BACKGROUND

Diverse welding methods are already available for creating a continuous welded connection between moulded parts, in particular, thermoplastic moulded parts. These methods are, however, hampered in the making of a welded connection by the presence of an electrically conductive component and/or fibre reinforcement. When a resistance wire is used, short-circuiting may, for instance, occur between the resistance wire and the electrically conductive component. This resistance wire is fused between the thermoplastic moulded parts during the welding process. This problem can be solved by electrically insulating the resistance wire from the conductive component in the thermoplast. With this solution, however, even more material, in addition to the resistance wire, is fused between the thermoplastic moulded parts, which can adversely affect the construction. In vibration welding the fibres may be damaged by the movement. Ultrasonic welding is less suitable for continuous welding. Many of the available welding methods are, moreover, unsuitable for welding large and continuous welded connections. These known welding methods result in products of inferior quality, particularly in high-grade applications in which a great mechanical strength and load-bearing capacity of the welded connection are desired, in particular, in the aviation industry.

SUMMARY

The present disclosure describes several exemplary embodiments of the present invention.

One aspect of the present disclosure provides a method for electromagnetic welding of moulded parts, comprising the steps of A) providing a mould; B) placing at least two moulded parts for coupling in the mould, wherein at least a contact surface between the moulded parts comprises a thermally activated coupling means and an induction-sensitive component; C) activating the coupling means by heating the induction-sensitive component by means of an inductor, wherein the inductor is situated outside the mould, the inductor comprises an electrical conductor which, under alternating voltage, generates an electromagnetic field which is substantially cylindrical in at least a direction of welding, and wherein the electromagnetic field of the inductor reaches the contact surface between the moulded parts through a wall of the mould; and D) pressing the moulded parts together in the configuration defined by the mould, wherein the moulded parts are coupled by the thermally activated coupling means.

Another aspect of the present disclosure provides an assembly of at least two moulded parts connected by electromagnetic welding obtainable by means of a method comprising A) providing a mould; B) placing at least two moulded parts for coupling in the mould, wherein at least a contact surface between the moulded parts comprises a thermally activated coupling means and an induction-sensitive component; C) activating the coupling means by heating the induction-sensitive component by means of an inductor, wherein the inductor is situated outside the mould, the inductor comprises an electrical conductor which, under alternating voltage, generates an electromagnetic field which is substantially cylindrical in at least a direction of welding, and wherein the electromagnetic field of the inductor reaches the contact surface between the moulded parts through a wall of the mould; and D) pressing the moulded parts together in the configuration defined by the mould, wherein the moulded parts are coupled by the thermally activated coupling means.

A further aspect of the present disclosure provides an inductor, comprising an induction part which is substantially manufactured from an electrically conductive material and an induction segment provided with at least one electrically conductive feed conductor, wherein at least an induction segment of the inductor is adapted to generate an electromagnetic field which is substantially cylindrical in at least a direction of welding.

An additional aspect of the present disclosure provides an assembly, comprising: an inductor and an alternating current generator, wherein the alternating current generator is connected to the electric connecting means of the inductor.

Yet another aspect of the present disclosure provides a device for electromagnetic welding of moulded parts, comprising A) a mould for receiving at least two moulded parts such that a contact surface is created between the moulded parts; B) an inductor adapted to generate a substantially cylindrical electromagnetic field at the position of the contact surface; C) an alternating current generator connected to the inductor; and D) pressure means for pressing the moulded parts together in the configuration defined by the mould.

The present disclosure provides for this purpose a method for electromagnetic welding of moulded parts, comprising the steps of A) providing a mould, B) placing at least two moulded parts for coupling in the mould, wherein at least a contact surface between the moulded parts comprises a thermally activated coupling means and an induction-sensitive component, C) activating the coupling means by heating the induction-sensitive component by means of an inductor, wherein the inductor is situated outside the mould, the inductor comprises an electrical conductor which, under alternating voltage, generates an electromagnetic field which is substantially cylindrical in at least a direction of welding, and wherein the electromagnetic field of the inductor reaches the contact surface between the moulded parts through a wall of the mould, and D) pressing the moulded parts together in the configuration defined by the mould, wherein the moulded parts are coupled by the thermally activated coupling means. This method makes it possible to realize a good-quality welded connection between the moulded parts in a rapid and simple manner, wherein the product has a particularly good mechanical load-bearing capacity. Because the inductor does not come into contact with the mould or the moulded parts, the chance of mechanical damage is minimized, this being particularly important for high-grade applications such as aviation.

In one exemplary embodiment of the method, the inductor comprises a linear induction segment which generates an electromagnetic field which is substantially cylindrical in at least a direction of welding, wherein the inductor is positioned such that the induction segment runs substantially parallel to the wall of the mould. In this manner the contact surface can be heated in a highly selective manner, whereby a precise welded connection is obtained.

One or more moulded parts are preferably manufactured from a thermoplastic material which can be welded by fusion, although it is also possible to envisage arranging a thermoplastic material or a thermally activated adhesive only on the contact surface between the moulded parts as thermal coupling means.

Induction-sensitive components generally comprise an electrically conductive component, such as a metal and/or carbon fibre. The mould and other components in the vicinity of the inductor which do not have to be heated are preferably substantially free of induction-sensitive components, wherein electrically insulating yet thermally conductive components such as ceramic material are recommended for extracting heat from the contact surface of the adjacent moulded part during the welding. In such a mould the electromagnetic field can then be applied at the desired position through the wall of the mould.

In the method the preferably thermoplastic moulded parts are generally provided with an electrically conductive component, for instance, metal gauze, or this component is arranged between the moulded parts. Foucault currents or eddy currents are induced in the electrically conductive component by a fluctuating electromagnetic field which is generated by an inductor supplied with alternating current by a generator. Owing to the Joule effect, these Foucault currents generate the heat required to melt the thermoplastic material and/or activate the coupling means. By moving the inductor along the contact surface, the thermoplastic moulded parts are mutually connected over their contact surface. The inductor can be guided over the contact surface, for instance, by means of a robot arm or linear guide in order to realize the connection.

The use of a substantially cylindrical electromagnetic field in the welding direction enables very controlled, uniform and targeted heating, so that overheating is prevented as far as possible. Overheating may result in degradation of material, and thereby cause undesirable weakening of the construction. Most known prior art inductors make use of an inductor with a plurality of windings, which produces a torus-shaped electromagnetic field. By using such a known inductor with the direction at right angles to the inductor as direction of induction, a heating pattern is created in which a relatively cold zone occurs in the centre. The cylindrical electromagnetic field on the other hand produces a much more favourable heating profile which enables uniform heating. A cylindrical electromagnetic field can moreover be made very narrow, up to a width of 10-20 mm. In torus-shaped fields such a width cannot be realized in combination with the required heat-inducing power and penetration.

For the purpose of heating, the induction-sensitive component must be in thermal contact with the thermally activated coupling means. This is, for instance, possible by mixing the induction-sensitive component and the coupling means.

Because the inductor is situated outside the mould and the electromagnetic field of the inductor reaches the contact surface between the moulded parts through a wall of the mould, the moulded parts can be brought under pressure by the mould during the welding. This is a great advantage. Existing methods generally only apply pressure after the inductive heating of the moulded parts for coupling. The compression of the moulded parts can take place using means known from the prior art, such as pneumatic or hydraulic presses and rollers.

The pressure is preferably applied on the mould on the non-inductor side of the mould, in other words on that side of the mould where the inductor is not situated. The wall of the mould is preferably provided with a recess at the position of the contact surface, in other words above the welding position. Such a recess makes it possible to move the inductor closer to the contact surface, whereby heating can take place with greater precision and whereby less power is also required. In order to make the pressure on the moulded parts for coupling as high as possible at the location of the welding position, it is advantageous to make the width of the recess as small as possible, and preferably such that the width of the recess hardly exceeds the inductor width. In order to be able to obtain the highest possible pressure, the wall is manufactured at the position of the recess from a material with a high stiffness.

Depending on the materials used, in particular, the induction-sensitive component, and the distance of the inductor from this component, a suitable power and frequency can be determined. The frequency determines inter alia the penetrative power of the electromagnetic field; the electric power of the inductor determines the strength of the fluctuating electromagnetic field and thereby the degree of heat generated in the induction-sensitive component.

It is advantageous if the thermally activated coupling means comprises a thermoplastic plastic. Thermoplastic plastics can be coupled in a simple manner by fusion. Furthermore, it is easy to mix a thermoplastic plastic with an induction-sensitive component such as metal gauze or carbon fibres. Examples of particularly suitable thermoplastic plastics are polypropylene, polyamide, polyether imide, polyether ether ketone and polyphenylene sulphide, and the like, although the method is, in principle, suitable for any thermoplastic.

The component heatable by induction preferably comprises carbon fibres and/or a metal. These materials can be readily heated by induction and also have, in addition to electrical conduction, a good thermal conduction, whereby the generated heat is well distributed. Carbon fibres incorporated in a thermoplastic plastic are recommended because the carbon fibres also improve the material strength.

In another exemplary embodiment of the method, the component heatable by induction comprises ferromagnetic particles. Suitable particles are, for instance, described in International Patent Publication No. WO 2001/85827 and have the additional advantage that, when the particles reach the so-called Curie temperature thereof, they lose their magnetic dipoles, whereby the particles do not heat any further. This can form a protection against overheating.

In the method according to the present disclosure, it is possible for both the mould and the inductor to be stationary. This may, for instance, be appropriate for the coupling of a relatively small portion of the contact surface of the moulded parts. In one exemplary embodiment, the inductor is moved along a path relative to the contact surface during step C) such that the coupling means is activated in a predetermined part of the contact surface. A very precisely defined connection is realized on the contact surface by moving the cylindrical electromagnetic field along the path. It is also possible to hold the inductor stationary and to move the mould with moulded parts.

In yet another exemplary embodiment of the method according to the present disclosure, the electrically conductive component is electrically connected to an electrically conductive extension piece, which preferably extends outside the surface of the assembly. Such an extension piece can, in principle, be manufactured from any electrically conductive material but is preferably manufactured from metal, from carbon, or comprises an adjustable resistor. The Foucault currents or eddy currents induced in the contact surface are bounded by the geometry of the moulded parts. Edges, corners and holes in the moulded parts influence the distribution of Foucault currents and, therefore, also influence the heat developed. Such disruptions of the field may result in heating of components which do not have to be heated for the welding process. Conversely, it is also possible that determined parts are difficult to heat. These problems can be solved by repositioning the boundaries of the area where Foucault currents may begin to occur at determined locations of the thermoplastic moulded parts. With this preferred variant, parts which were formerly difficult to heat can nevertheless be heated and high temperatures at undesired locations can be prevented.

The present disclosure also provides an assembly of at least two moulded parts connected by electromagnetic welding obtainable by means of the method disclosed hereinabove. Such an assembly has a particularly good, regular weld on the contact surface between the moulded parts with a high mechanical load-bearing capacity. By applying the method according to the present disclosure, the melting bath is preferably oval in cross-section at the contact surface and moreover substantially continuous and uniform over substantially the whole weld length. It will be apparent that an assembly in which the periphery of the welding bath has small variations from the oval form in a cross-section at the position of the contact surface likewise forms part of the invention. For purposes of the present disclosure, the term substantially continuous means that the weld has no interruptions worthy of mention in the longitudinal direction thereof.

The present disclosure also provides an inductor, evidently suitable for use in the method disclosed hereinabove, comprising an induction part which is substantially manufactured from an electrically conductive material and an induction segment provided with at least one electrically conductive feed conductor, wherein at least an induction segment of the inductor is adapted to generate an electromagnetic field which is substantially cylindrical in at least a direction of welding. For this purpose the induction segment preferably takes a linear form, wherein the cross-section of the electromagnetic field is influenced by the cross-section of this induction segment. With such an inductor it is possible, in a simple and precise manner, to heat a predetermined position in a uniform and controlled manner. The electrically conductive material is preferably a metal such as copper. For purposes of the present disclosure, a linear induction segment means an induction segment with a length which is at least twice, and preferably at least ten times, the linear cross-sectional dimension (the diameter for a circular cross-section).

For application in the method according to the present disclosure, the inductor is connected to an alternating current generator, wherein the alternating current generator is electrically connected to the electrical connecting means of the inductor. Usable frequencies lie generally between 0.1-10 MHz. A frequency between 0.1 and 0.5 MHz is preferably used, and more preferably a frequency between 0.15 and 0.4 MHz. At such a preferred frequency, an optimal balance is achieved between penetrative power of the electromagnetic field and rate of heating.

The induction segment is preferably substantially linear. With such an induction segment, a cylindrical electromagnetic field can be realized in a simple manner. If desired, the electric feed conductors can be curved.

In one exemplary embodiment, the induction segment has a substantially circular cross-section. A circular cross-section produces a circular electromagnetic field at the position of the cross-section in a simple manner. The shape of the electromagnetic field at the position of the cross-section can be influenced by a different design of the cross-section, for instance, triangular.

The inductor preferably has no windings. Such an inductor can be embodied very compactly and is thereby suitable for very precisely determined induction.

It is advantageous if the inductor is substantially flat. This is possible, for instance, by embodying the winding-free inductor as an electrical conductor lying in one plane. Such a flat inductor is exceptionally compact and suitable for applying an electromagnetic field at a determined position in a very precise and uniform manner.

It is advantageous if the feed conductor has a larger cross-sectional area than the induction segment. An electromagnetic field generated by alternating current is hereby stronger at the position of the induction segment than in the feed conductor, whereby the heating by induction can be very precisely targeted. The ratio of the linear cross-sectional dimension of the feed conductor and the linear cross-sectional dimension (the diameter for a circular cross-section) of the induction segment is for this purpose preferably chosen between 1 and 20, and more preferably between 1.2 and 10. The ratio of the length of the induction segment and the linear cross-sectional dimension of the induction segment is moreover preferably chosen for this purpose between 2 and 100, and more preferably between 5 and 50.

In another exemplary embodiment, the induction part is provided with at least one feed channel adapted for passage of a cooling medium. The temperature of the induction part can hereby be held constant during use, this also being favourable for the electrical resistance of the inductor. The cooling medium is preferably a liquid such as water with a high heat capacity. The induction part can, for instance, be a metal tube bent into the desired form through which the cooling medium is pumped while an electromagnetic field is caused through the metal of the tube itself with an alternating voltage.

The present disclosure also provides a device for electromagnetic welding of moulded parts, comprising a mould for receiving at least two moulded parts such that a contact surface is created between the moulded parts, an inductor adapted to generate a substantially cylindrical electromagnetic field at the position of the contact surface, an alternating current generator connected to the inductor, and pressure means for pressing the moulded parts together in the configuration defined by the mould. The method according to the present disclosure can be performed in an advantageous manner in such a device.

BRIEF DESCRIPTION OF THE DRAWINGS

Various aspects of the present disclosure are described hereinbelow with reference to the accompanying figures.

DETAILED DESCRIPTION

Figure 1A:
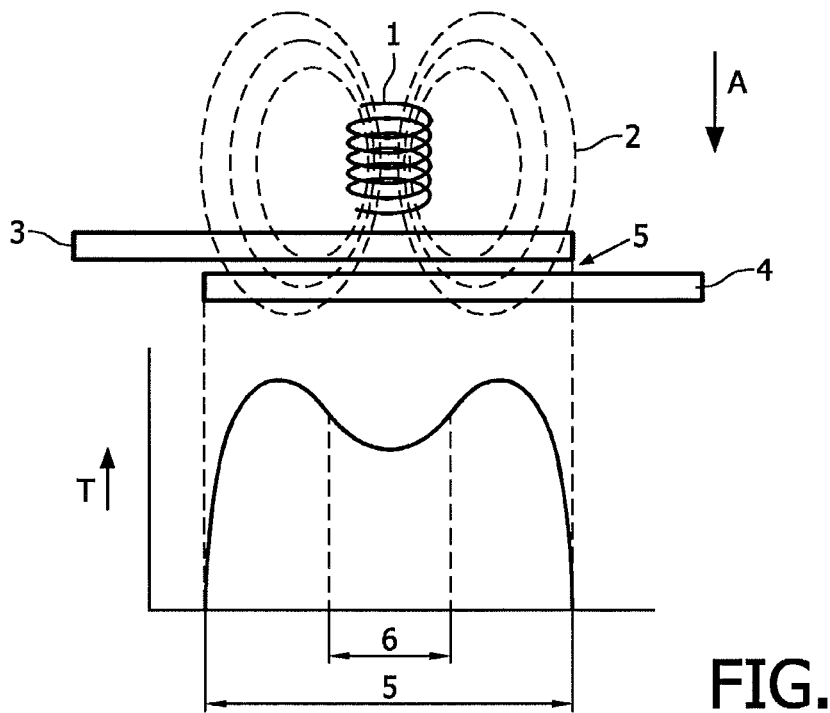
FIG. 1a shows electromagnetic welding with a torus-shaped field.

FIG. 1a shows a cross-section of an inductor 1 with a plurality of windings which causes a torus-shaped electromagnetic field 2 by applying an alternating current of a frequency suitable for electromagnetic welding at a suitable power. A first moulded part 3 and a second moulded part 4 are brought into mutual contact in this electromagnetic field 2. The moulded parts are manufactured from a thermoplastic plastic reinforced with carbon fibres. Heat develops locally in the carbon fibres under the influence of electromagnetic field 2, whereby the thermoplastic plastic is heated to above the melting point. By pressing with pressing means (not shown) it is possible to couple the thus thermally activated thermoplastic moulded parts 3, 4 at contact surface 5, wherein the coupling at contact surface 5 becomes permanent after cooling of moulded parts 3, 4. The figure further shows the temperature diagram at the contact surface during heating, in which the relative temperature T is plotted against the position on contact surface 5. The temperature diagram shows that torus-shaped field 2 causes an irregular heating on contact surface 5, wherein a relatively cold zone 6 occurs in the centre of contact surface 5 in the welding direction A at right angles to the windings of the inductor. Due to this relatively cold zone a uniform heating is impossible, which results in the coupled assembly between the moulded parts in a relatively high number of irregularities which imply a reduced mechanical load-bearing capacity. The irregularities can, for instance, comprise parts of the moulded parts thermally degraded by local overheating and local incomplete mutual adhesion of the moulded parts.

Figure 1B:
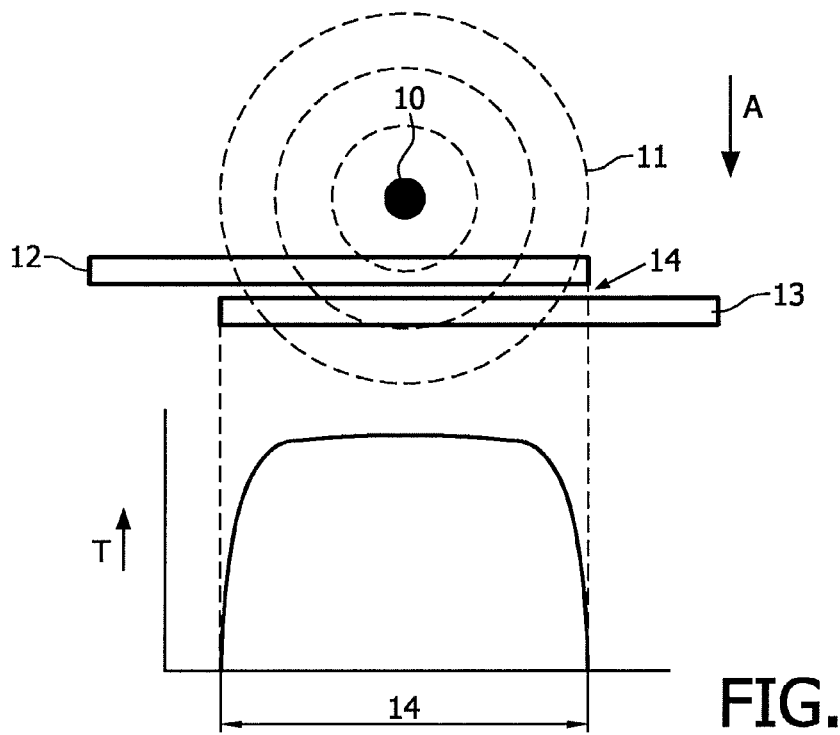
FIG. 1b shows electromagnetic welding with a cylindrical field.

FIG. 1b shows electromagnetic welding according to the present disclosure. A cross-section shows how a linear part of a winding-free inductor 10 causes a substantially cylindrical electromagnetic field 11 under the influence of alternating voltage. A first moulded part 12 and a second moulded part 13 of a material comparable to parts 3, 4 of FIG. 1a are welded together electromagnetically at a contact surface 14 under the influence of this field and optional pressing means. The linear part of winding-free inductor 10 is herein oriented parallel to contact surface 14. The associated temperature diagram shows that the cold zone 5 of torus-shaped field 2 in FIG. 1a is absent when a cylindrical electromagnetic field is used, whereby a much more uniform heating is possible over contact surface 14. In the obtained product, the two moulded part 12, 13 are mutually coupled by means of contact surface 14, wherein significantly fewer irregularities occur than in coupling obtained under comparable conditions with a torus-shaped field. This has the result that the product obtained under the influence of the cylindrical electromagnetic field has a better mechanical load-bearing capacity than the product obtained with a torus-shaped electromagnetic field. The electromagnetic field 11 can moreover be directed very precisely in the indicated direction A.

Figure 2A:
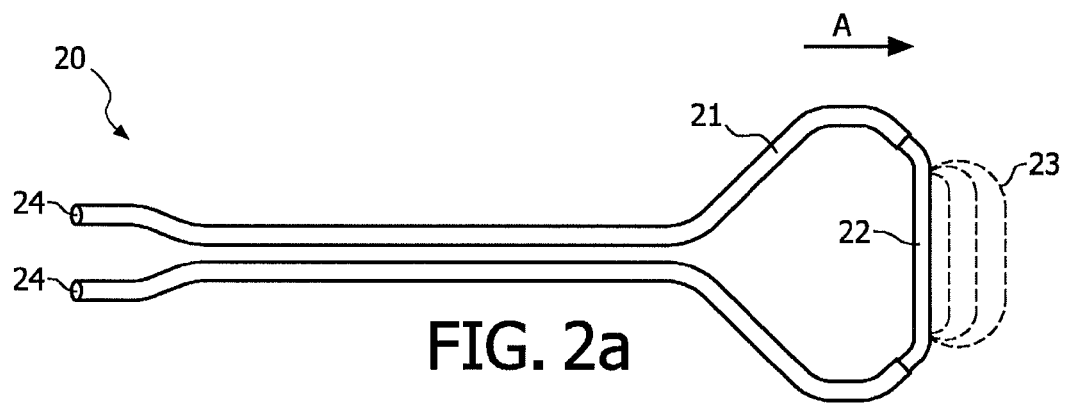
FIG. 2a shows one exemplary embodiment of an inductor according to the present disclosure.
Figure 2B:
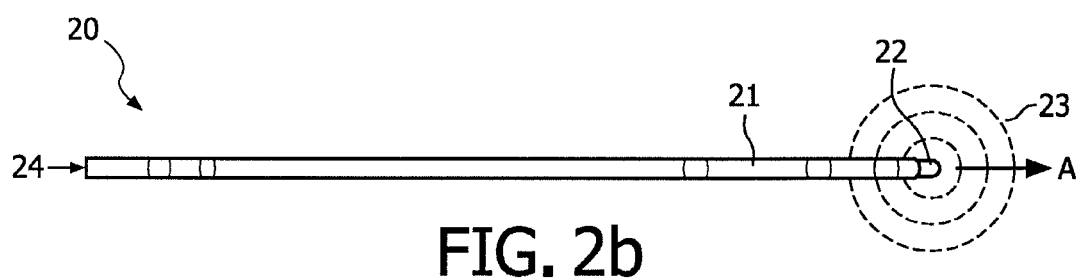
FIG. 2b shows a second exemplary embodiment of an inductor according to the present disclosure.

FIGS. 2a and 2b show an inductor 20 according to the present disclosure. Inductor 20 is manufactured from copper, which is a good electrical and thermal conductor. Feed conductors 21 can be connected to an alternating current generator. Feed conductors 21 connect to a linear induction segment 22. Induction segment 22 has a circular diameter, whereby an electromagnetic field 23 with a profile which is cylindrical at least in the direction of induction A is generated when an alternating voltage is applied (FIG. 2b). Inductor 20 is hollow on the inside, whereby a feed channel 24 is formed for a cooling medium such as water, which can be fed through during use. The cross-sectional area of feed conductors 21 is greater than that of the induction segment, whereby the cylindrical electromagnetic field 23 is more concentrated and has a greater strength at a short distance than the non-cylindrical electromagnetic field (not shown) which results around other parts of inductor 20. It is hereby possible to target the power of electromagnetic field 23 very precisely at a position for electromagnetic welding, for instance, of two adjacent moulded parts. Inductor 20 comprises a winding-free inductor lying in one plane, whereby the inductor is exceptionally compact.

Figure 3:
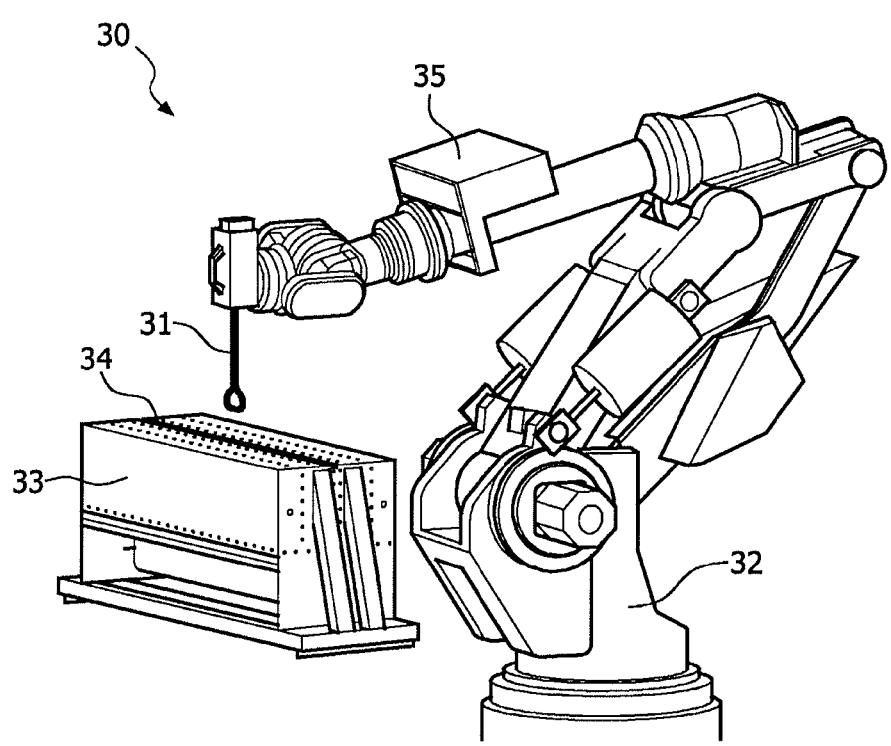
FIG. 3 shows a welding device provided with an inductor according to the present disclosure.
Figure 4:
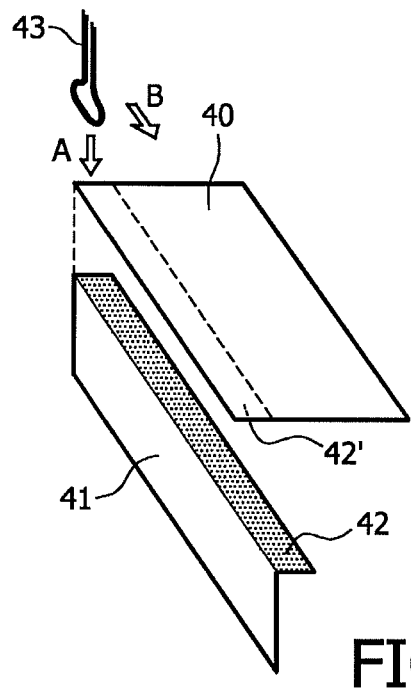
FIG. 4 shows two moulded parts coupled by the method according to the present disclosure.

FIG. 3 shows a welding device 30 provided with an inductor 31, similar to inductor 20 of FIGS. 2a and 2b according to the present disclosure. Inductor 31 can be guided along a pre-programmed path by means of an industrial six-axis robot 32 in order to achieve a desired weld. In this case moulded parts for welding (shown in FIG. 4) are fixed and pressed together in a mould 33 manufactured for this purpose. Mould 33 is provided with a recess 34 through which the inductor can be moved close to the moulded parts for welding (FIG. 4). Mould 33 is shown in more detail in FIG. 5. The inductor is connected to an alternating current generator 35 arranged on robot 32 for the purpose of generating the electromagnetic field.

FIG. 4 shows two moulded parts 40, 41 coupled by the method according to the present disclosure. Both moulded parts 40, 41 are manufactured from a thermoplastic plastic reinforced with carbon fibres, wherein the carbon fibres also serve as an induction-sensitive component for heating the thermoplastic plastic for the purpose of welding. First moulded part 40 is a flat part; second moulded part 41 has a folded edge 42 which forms the intended contact surface for coupling between the moulded parts. Using a cylindrical electromagnetic field, the inductor 43, similar to that of the foregoing FIGS. 1b, 2a, 2b and 3, heats the moulded parts 40, 41 in the placed-together situation to a temperature which is high enough to thermally activate the thermoplastic plastic (or optionally a thermally activated adhesive applied to contact surface 42, 42'). The inductor is herein moved over the contact surface in the direction B of the longitudinal axis of the cylindrical electromagnetic field without making physical contact. During the heating and/or optionally a short time thereafter, the thermally activated surfaces can be pressed together by pressure means (not shown) so as to thus bring about a connection between the moulded parts 40, 41. This connection has a particularly high mechanical load-bearing capacity. The moulded parts can, for instance, consist of carbon fibre-reinforced polyphenylene sulphide, for instance, with a material thickness of 1-3 mm. Shear strengths higher than 30 MPa can be realized in simple manner using the method according to the present disclosure. The width of the realized weld can be particularly small, for instance 10 mm, by making use of the cylindrical electromagnetic field according to the present disclosure.

Figure 5:
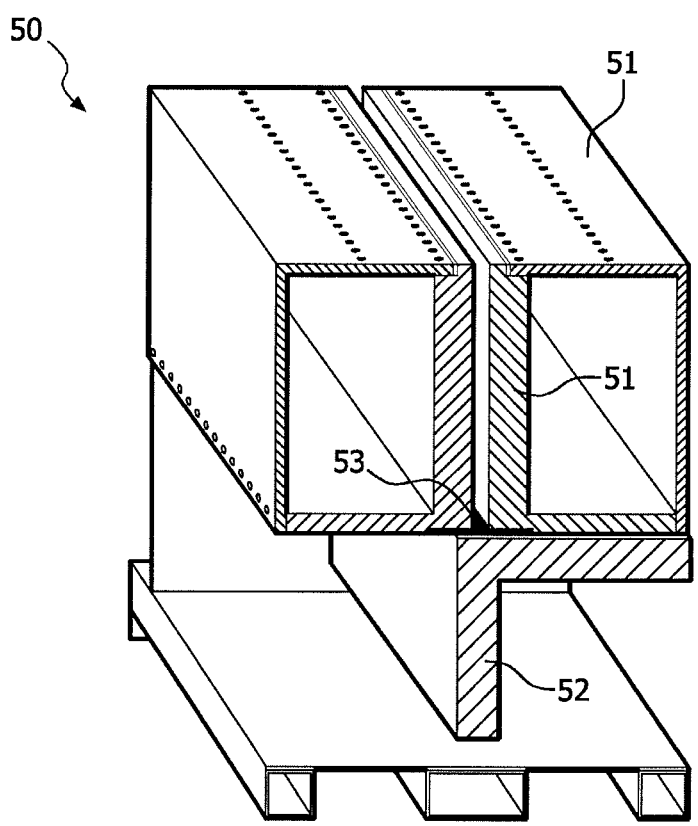
FIG. 5 shows a mould which can be used in the electromagnetic welding according to the present disclosure.

FIG. 5 shows a mould 50 which can be used in the electromagnetic welding according to the present disclosure. Mould 50 comprises several electrically non-conductive parts 51, 52 between which the moulded parts of, for instance, FIG. 4 can be pressed together. A material part 53 is arranged at the position of the contact surface intended for coupling. The material part 53 is not electrically conductive but is thermally conductive, such as a ceramic material, which serves to distribute and discharge the heat generated from the moulded parts during applying of an electromagnetic field, and also to prevent deformations of the thermoplastic material. A recess 54 is arranged in mould 50 through which the inductor can be brought as closely as possible (0.5-2 cm from the welding zone) into the vicinity of the contact surface between the moulded parts without coming into contact therewith. For mechanical strengthening and in order to discharge heat from the mould, the mould is provided on the outside with a metal outer layer 54. The parts in the vicinity of the inductor are preferably manufactured from non-electrically conductive materials such as wood or plastic.

All patents, patent applications and publications referred to herein are incorporated by reference in their entirety.

The invention claimed is:

1. A method for electromagnetic welding of moulded parts, comprising the steps of:
   A) providing a mould;
   B) placing at least two moulded parts for coupling in the mould, wherein at least a contact surface between the moulded parts comprises a thermally activated coupling means and an induction-sensitive component;
   C) activating the coupling means by heating the induction-sensitive component by means of an inductor, wherein the inductor is situated outside the mould such that the inductor does not come into contact with the mould in order to enable a mutual movement between the inductor and the moulded parts that defines a direction of welding, wherein the inductor comprises an electrical conductor which, under alternating voltage, generates an electromagnetic field which is substantially cylindrical in at least said direction of welding, and wherein the electromagnetic field of the inductor reaches the contact surface between the moulded parts through a wall of the mould; and
   D) pressing the moulded parts together in the configuration defined by the mould, wherein the moulded parts are coupled by the thermally activated coupling means.

2. The method of claim 1, wherein the inductor is moved along a path relative to the contact surface during step C) such that the coupling means is activated in a predetermined part of the contact surface.

3. The method of claim 2, wherein the wall of the mould is provided with a recess at the position of the contact surface.

4. The method of claim 1, wherein the inductor comprises a linear induction segment which generates an electromagnetic field which is substantially cylindrical in at least said direction of welding, and that the inductor is positioned such that the induction segment runs substantially parallel to the wall of the mould.

5. The method of claim 1, wherein the thermally activated coupling means comprises a thermoplastic plastic.

6. The method of claim 1, wherein the component heatable by induction comprises at least one of carbon fibres and a metal.

7. The method of claim 1, wherein the component heatable by induction comprises ferromagnetic particles.

8. The method of claim 1, wherein the induction-sensitive component is electrically connected to a heat discharge extending a distance from the moulded parts.

9. The method of claim 1, wherein the inductor comprises an induction part which is manufactured substantially from an electrically conductive material and a substantially linear induction segment provided with at least one electrically conductive feed conductor, wherein the induction segment is connected to an electric connecting means by means of at least one feed conductor, which has a greater area per unit of length than the induction segment.

* * * * *